United States Patent
Zhang et al.

(10) Patent No.: US 11,365,272 B2
(45) Date of Patent: Jun. 21, 2022

(54) MULTI-COPOLYMER, METHODS FOR PRODUCING THE SAME AND USING THEREOF IN WASTEWATER TREATMENT

(71) Applicant: Jiangnan University, Wuxi (CN)

(72) Inventors: Dan Zhang, Wuxi (CN); Chuang Zheng, Wuxi (CN)

(73) Assignee: Jiangnan University, Wuxi (CN)

( * ) Notice: Subject to any disclaimer, the term of this patent is extended or adjusted under 35 U.S.C. 154(b) by 236 days.

(21) Appl. No.: 16/753,370

(22) PCT Filed: May 9, 2018

(86) PCT No.: PCT/CN2018/086156
§ 371 (c)(1),
(2) Date: Apr. 3, 2020

(87) PCT Pub. No.: WO2019/213868
PCT Pub. Date: Nov. 14, 2019

(65) Prior Publication Data
US 2020/0277425 A1  Sep. 3, 2020

(51) Int. Cl.
| | |
|---|---|
| *C08F 212/14* | (2006.01) |
| *C08F 218/08* | (2006.01) |
| *C08F 220/34* | (2006.01) |
| *C08F 220/56* | (2006.01) |
| *C08F 232/04* | (2006.01) |
| *C02F 1/56* | (2006.01) |
| *C02F 101/22* | (2006.01) |
| *C02F 103/28* | (2006.01) |

(52) U.S. Cl.
CPC ............ *C08F 212/28* (2020.02); *C02F 1/56* (2013.01); *C08F 218/08* (2013.01); *C08F 220/34* (2013.01); *C08F 220/56* (2013.01); *C08F 232/04* (2013.01); *C02F 2101/22* (2013.01); *C02F 2103/28* (2013.01)

(58) Field of Classification Search
None
See application file for complete search history.

(56) References Cited

FOREIGN PATENT DOCUMENTS

| CN | 102617793 A | * | 8/2012 |
|---|---|---|---|
| CN | 106430503 A | * | 2/2017 |

OTHER PUBLICATIONS

Machine translation of CN 106430503 A, pp. 1-7. (Year: 2017).*
Machine translation of CN 102617793 A, pp. 1-8. (Year: 2012).*

* cited by examiner

*Primary Examiner* — Clare M Perrin
(74) *Attorney, Agent, or Firm* — Idea Intellectual Limited; Margaret A. Burke; Sam T. Yip

(57) ABSTRACT

A multi-copolymer, methods for producing the same and using thereof in wastewater treatment application are provided. The method includes pre-mixing by mass 10-30 parts by mass of alkenyl succinic anhydrides, 10-30 parts of vinylbenzyltrimethylammonium chloride, and 10-30 parts of dimethylaminoethyl methacrylate with water to form a first mixture; reacting the first mixture comprising passing thereof through inert gases to provide reflux protection, and adding by mass 10-30 parts of vinyl acetate and 10-30 parts of acrylamide to form a second mixture, followed by heating the second mixture and adding an initiator therein to initiate the reaction. The present invention is simple, at low cost, safe, non-toxic, environmentally friendly, easy to operate, with a better water purification efficiency than that of conventional macromolecule flocculants, multi-functional, good product stability, strong adsorption bridging ability, less dosage requirement for the water treatment agent, and results in a sturdy sludge cake and easily separated flocs.

15 Claims, No Drawings

MULTI-COPOLYMER, METHODS FOR PRODUCING THE SAME AND USING THEREOF IN WASTEWATER TREATMENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is a 371 application of the International Patent Application No. PCT/CN2018/086156 filed on May 9, 2018, and the disclosures of which is incorporated herein by reference in its entirety.

FIELD OF THE INVENTION

The present invention relates generally to the technical field of water treatment agent. More specifically, it relates to a multi-copolymer, a method for producing the same and using thereof in wastewater treatment.

BACKGROUND

The composition of industrial wastewater is complex with different properties, which contains a lot of harmful substances that can cause environmental pollution such as organic aerobic substances, chemical poisons, inorganic suspended solids, heavy metal ions, pathogens, plant nutrients, etc. Some industries such as food, pharmaceutical, leather, paper, textile, printing and dyeing industries are the main sources of industrial wastewater. In the printing and dyeing industries, for instance, the pollutants in printing and dyeing wastewater are mostly hardly degradable dyes, auxiliaries, and toxic and harmful heavy metal ions, formaldehyde, halides, etc. If the wastewater is directly discharged into the waterbody without treatment, lesions may quickly occur in aquatic animals as well as plants, or even die.

Water treatment agent is a term for a class of chemicals used in water treatment industry. Water treatment agents include corrosion inhibitors, scale inhibitors, bactericides, flocculant, cleaning agents, purifying agents, etc., which are mainly used for removal of suspended solids and toxic substances from water, preventing the formation of scale and sludge, reducing corrosion of materials in contact with water, deodorization and sterilization, decolorization, softening, and stabilizing water quality.

Flocculants are one kind of widely used water treatment agent. They are mainly based on the theory of charge neutralization, bringing the groups with positive (or negative) charge close to colloidal particles with negative (or positive) charge in water to reduce the potential; concentrating these particles according to their polymerization properties; and the particles would be separated by physical or chemical method. Common flocculants are divided into two categories: inorganic flocculants and organic flocculants. Inorganic flocculants are used in large amounts, having bad flocculation efficiency, strong corrosive properties, and large volumes of sludge. Organic macromolecule flocculant was a new type of wastewater treatment agent developed in the late 1960s. The molecular weight of the organic macromolecule flocculant is large; the prepared product is stable, a small amount use, minorly affected by pH and external environment, a small sludge volume, weak corrosive properties, and working fast, thereby receiving attentions in the industrial fields. In addition, it also shows significant advantages in the sales markets. Polyacrylamide (PAM) is a representative product containing a large amount of amide groups ($-CONH_2$), which bridging adsorption with the suspended matters through a unique $-CONH_2$ functional groups in the molecular chain. However, the efficiency on the treatment of heavy metal ions in wastewater is low and single.

Therefore, how to produce a water treatment agent with the advantages of good stability, a wide range of applications, strong adsorption bridging ability, less dosage requirement, and easily separated formed flocs is a technical problem which needs to be solved.

SUMMARY OF THE INVENTION

This section aims to summarize some aspects of the embodiments of the present invention and to briefly describe some preferred embodiments. Simplification or omission may be made in this section, the abstract of the specification, and the title to avoid obscuring the purposes of this section, the abstract of the specification, and the title. Such simplification or omission may not be used to limit the scope of the present invention.

As one aspect of the present invention, the present invention provides a method for producing a multi-copolymer in order to overcome the technical hurdles in the conventional technologies.

To solve the technical problems as above-mentioned, the present invention provides the following solutions: a method for producing a multi-copolymer comprising:

pre-mixing 10 to 30 parts by mass of alkenyl succinic anhydrides, 10 to 30 parts by mass of vinylbenzyltrimethylammonium chloride, and 10 to 30 parts by mass of dimethylaminoethyl methacrylate with water to form a first mixture;

reacting the first mixture comprising passing thereof through inert gases to provide reflux protection, followed by adding 10 to 30 parts by mass of vinyl acetate and 10 to 30 parts by mass of acrylamide to form a second mixture, and heating the second mixture while adding an initiator to initiate the reaction.

According to one embodiment of the present invention, said pre-mixing includes adding the water at a weight 10 times of the total weight of the alkenyl succinic anhydrides, vinylbenzyltrimethylammonium chloride and dim ethyl aminoethyl methacrylate into the mixture of the alkenyl succinic anhydrides, vinylbenzyltrimethylammonium chloride and dim ethyl aminoethyl methacrylate.

According to one embodiment of the present invention, said heating the second mixture and adding the initiator therein to initiate the reaction comprises dissolving 0.1 to 1.0 parts by mass of potassium persulfate into 20 mL of water to form a potassium persulfate solution; heating the potassium persulfate solution until 50 to 80° C.; slowly titrating the potassium persulfate solution for 1 hour; dissolving 0.1 to 1.0 parts by mass of azobisisobutylphosphonium hydrochloride initiator into 20 mL water to form a azobisisobutylphosphonium hydrochloride initiator solution; and slowly titrating the azobisisobutylphosphonium hydrochloride initiator solution for 1 hour.

According to one embodiment of the present invention, the reaction comprises keeping a reaction temperature at 50 to 80° C. for a reaction time of 14 to 22 hours; and stirring the reaction solution, wherein the stirring speed is from 100 to 300 rpm, and a pH value is kept within a range from 3.0 to 10.0.

According to one embodiment of the present invention, a mass ratio of the vinyl acetate:acrylamide:alkenyl succinic anhydride:vinylbenzyltrimethylammonium chloride:dimethylaminoethyl methacrylate is 20:30:30:10:10.

According to one embodiment of the present invention, the method further includes:

standing and cooling the reaction solution to room temperature, followed by conducting dialysis in a dialysis tubing with a molecular weight cut-off of 8000 to 14000 Da for 3 to 4 days; and transferring the reaction solution into a freeze dryer to undergo freeze-drying for 48 to 72 hours to obtain a solid, powdery pentapolymer.

To solve the above-mentioned technical problems of the conventional technologies, the present invention also provides the following solutions: a multi-copolymer comprising vinyl acetate, acrylamide, alkenyl succinic anhydride, vinylbenzyltrimethylammonium chloride, dimethylaminoethyl methacrylate, wherein said vinyl acetate, acrylamide, alkenyl succinic anhydride, vinylbenzyltrimethylammonium chloride, and dimethylaminoethyl methacrylate have a mass ratio of 10-30:10-30:10-30:10-30:10-30.

Another aspect of the present invention provides a method for treating wastewater including applying the multi-copolymer prepared according to any of the appended claims.

The present invention has the following advantages: the pentapolymer prepared according to the present invention acts as a macromolecule water treatment agent, in which the molecular structure contains multiple functional groups. The pentapolymer exhibits significant advantages such as good stability, a wide range of applications, strong adsorption bridging ability, less dosage requirement, and easily separated flocs. Because the molecular chains of the pentapolymer contain a variety of ligands such as amino and hydroxyl groups, it could interact with various heavy metal ions in industrial wastewater so that the heavy metal ions in water could be captured and fixed. In addition, the cationic monomer could well neutralize the negative charge on the surface of colloidal particles in wastewater because it is positively charge, making it more tightly and firmly associated with the colloidal particles. Meanwhile, the captured heavy metal ions greatly increase the specific gravity of the flocculent material, thereby further optimizing the flocculation efficiency.

DETAILED DESCRIPTION

To make the above-mentioned objectives, features and advantages more easily be understood, the following description accompanied with examples illustrate the embodiments of the present invention.

Although the following descriptions illustrate in detail in order to facilitate understanding of the present invention, it should be understood by a skilled person in the art that the present invention can also be enabled by other ways not described herein. The skilled person in the art can also implement the present invention without departing from the spirit of the present invention such that the following descriptions concerning the examples will not limit the present invention.

In addition, the expressions "embodiment" or "example" or alike used herein refers to including specific features, structure and characteristics of at least one embodiment of the present invention. "According to an embodiment of the present invention" or alike appears in the present disclosure does not necessarily mean that it refers to the same embodiment, or it does not necessarily mean that it independently or selectively contradicts with one another.

Example 1

30 g of alkenyl succinic anhydride (ASA) in a four-neck flask were weighed and added into 300 g of deionized water to stir and dissolve. Nitrogen was passed into the four-neck flask for deaeration, and a Dimroth condenser was attached to provide reflux protection. After 30 minutes, 30 g of vinyl acetate (VAC) and 40 g of acrylamide (AM) were added, followed by adding 600 g of deionized water into the four-neck flask, and they were subject to continuous stirring for 30 minutes, and then the mixture was transferred into an oil bath pot. The mixture was then gradually heated to 60° C. at a stirring speed of 100 to 200 rpm, and slowly titrated with the potassium persulfate (0.1 g in 10 mL water), which is a type of initiator, in a first titration. After the first titration was completed, a water-soluble azo initiator (V-50) aqueous solution (0.3 g in 10 mL water) was used to titrate the mixture from the first titration in a second titration which is in the same manner as in the first titration. After the second titration was completed, the reactants in the mixture reacted for 16 hours under constant temperature and stirring speed to obtain a reaction solution. Finally, the reaction solution was cooled to room temperature, and then transferred into a dialysis tubing with a molecular weight cut-off of 8000 to 14000 Da, and then a dialysis was performed for purification. After 4 days of dialysis, the reaction solution was transferred into a freeze dryer to undergo freeze-drying to obtain a final product, that is, a terpolymer-containing macromolecular water treatment agent.

Example 2

20 g of ASA and 20 g of vinylbenzyltrimethylammonium chloride (VBTAC) were weighed in a four-neck flask and added with 400 g of deionized water to stir and dissolve. Nitrogen was passed into the four-neck flask for deaeration, and a Dimroth condenser was attached to provide reflux protection. After 30 minutes, 30 g of VAC and 30 g of AM were added, followed by adding 500 g of deionized water into the four-neck flask, and they were subject to continuous stirring for 30 minutes and then the mixture was transferred into an oil bath pot. The mixture was then gradually heated to 60° C. at a stirring speed of 100 to 200 rpm, and slowly titrated with the potassium persulfate (0.1 g in 10 mL water), which is a type of initiator, in a first titration. After the first titration was completed, a water-soluble azo initiator (V-50) aqueous solution (0.3 g in 10 mL water) was used to titrate the mixture from the first titration in a second titration which is in the same manner as in the first titration. After the second titration was completed, the reactants in the mixture reacted for 16 hours under constant temperature and stirring speed to obtain a reaction solution. Finally, the reaction solution was cooled to room temperature, and then transferred into a dialysis tubing with a molecular weight cut-off of 8000 to 14000 Da, and then dialysis was performed for purification. After 4 days of dialysis, the solution was transferred into a freeze dryer to undergo freeze-dry to obtain a final product, that is, a tetrapolymer-containing macromolecular water treatment agent.

Example 3

20 g of ASA and 20 g of VBTAC were weighed and added, followed by adding 20 g dimethylaminoethyl methacrylate (DMAEMA) in a four-neck flask and then adding 600 g of deionized water therein to stir and dissolve. Nitrogen was passed into the four-neck flask for deaeration, and a Dimroth condenser was attached to provide reflux protection. After 30 minutes, 20 g of VAC, 20 g of AM, and 300 g of deionized water were added into the four-neck flask, followed by continuous stirring for 30 minutes and transferring the mixture into an oil bath pot. The mixture was then gradually heated to 60° C. at a stirring speed of 100 to 200 rpm, and slowly titrated with the potassium persulfate (0.1 g in 10 mL water), which is a type of initiator, in a first titration. After the first titration was completed, a water-soluble azo initiator (V-50) aqueous solution (0.3 g in 10 mL water) was used to titrate the mixture from the first titration in a second titration which is in the same manner as in the first titration. After the second titration was completed, the reactants in the mixture reacted for 16 hours under constant temperature and stirring speed to obtain a reaction solution. Finally, the reaction solution was cooled to room temperature, then transferred into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, a pentapolymer-containing macromolecular water treatment agent.

Example 4

30 g of ASA, 10 g of VBTAC, and 10 g DMAEMA were weighed and added in a four-neck flask, followed by adding 500 g of deionized water to stir and dissolve. Nitrogen was passed into the four-neck flask for deaeration, and a Dimroth condenser was attached to provide reflux protection. After 30 minutes, 20 g of VAC, 30 g of AM, and 400 g of deionized water were added into the four-neck flask, followed by continuous stirring for 30 minutes and transferring the mixture into an oil bath pot. The mixture was then gradually heated to 60° C. at a stirring speed of 100 to 200 rpm, and slowly titrated with the potassium persulfate (0.1 g in 10 mL water), which is a type of initiator, in a first titration. After the first titration was completed, a water-soluble azo initiator (V-50) aqueous solution (0.3 g in 10 mL water) was used to titrate the mixture from the first titration in a second titration which is in the same manner as in the first titration. After the second titration was completed, the reactants in the mixture reacted for 18 hours under constant temperature and stirring speed to obtain a reaction solution. Finally, the reaction solution was cooled to room temperature, then transferred into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, a pentapolymer-containing macromolecular water treatment agent.

Example 5

20 g of ASA, 20 g of VBTAC, and 20 g DMAEMA were weighed and added in a four-neck flask followed by adding 600 g of deionized water to stir and dissolve. Nitrogen was passed into the four-neck flask for deaeration, and a Dimroth condenser was attached to provide reflux protection. After 30 minutes, 10 g of VAC, 30 g of AM, and 300 g of deionized water were added into the four-neck flask, followed by continuous stirring for 30 minutes and then transferring into an oil bath pot. The mixture was gradually heated to 60° C. at a stirring speed of 100 to 200 rpm, and slowly titrated with the potassium persulfate (0.1 g in 10 mL water), which is a type of initiator, in a first titration. After the first titration was completed, a water-soluble azo initiator (V-50) aqueous solution (0.3 g in 10 mL water) was used to titrate the mixture from the first titration in a second titration which is in the same manner as in the first titration. After the second titration was completed, the reactants in the mixture reacted for 20 hours under constant temperature and stirring speed to obtain a reaction solution. Finally, the reaction solution was cooled to room temperature, then transferred it into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, pentapolymer-containing macromolecular water treatment agent.

Example 6

20 g of ASA, 20 g of VBTAC, and 20 g DMAEMA were weighed in a four-neck flask followed by adding 600 g of deionized water to stir and dissolve. Nitrogen was passed into the four-neck flask for deaeration, and a Dimroth condenser was attached to provide reflux protection. After 30 minutes, 10 g of VAC, 30 g of AM, and 300 g of deionized water were added into the four-neck flask, followed by continuous stirring for 30 minutes and then transferring into an oil bath pot. The mixture was gradually heated to 60° C. at a stirring speed of 100 to 200 rpm, and slowly titrated with the potassium persulfate (0.3 g in 10 mL water), which is a type of initiator, in a first titration. After the first titration was completed, a water-soluble azo initiator (V-50) aqueous solution (0.1 g in 10 mL water) was used to titrate the mixture from the first titration in a second titration which is in the same manner as in the first titration. After the second titration was completed, the reactants in the mixture reacted for 20 hours under constant temperature and stirring speed. Finally, the reaction solution was cooled to room temperature, then transferred into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, pentapolymer-containing water treatment agent.

Example 7

10 g of ASA, 30 g of VBTAC, and 30 g DMAEMA were added in a four-neck flask followed by adding 700 g of deionized water to stir and dissolve. Nitrogen was passed into the four-neck flask for deaeration, and a Dimroth condenser was attached to provide reflux protection. After 30 minutes, 10 g of VAC, 20 g of AM, and 200 g of deionized water were added into the four-neck flask, followed by adding 900 g of deionized water and continuous stirring until the mixture is homogeneous. After 30 minutes, the mixture was transferred into an oil bath pot, and then gradually heated to 60° C. at a stirring speed of 100 to 200 rpm, and slowly titrated with the potassium persulfate (0.2 g in 10 mL water), which is a type of initiator, in a first titration. After the first titration was completed, a water-soluble azo initiator (V-50) aqueous solution (0.2 g in 10 mL water) was used to titrate the mixture from the first titration in a second titration which is in the same manner as in the first titration. After the second titration was completed, the reactants in the mixture reacted for 20 hours under constant temperature and stirring speed to obtain a reaction solution. Finally, the reaction solution was cooled to room temperature, transferred into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, pentapolymer-containing macromolecular water treatment agent.

The products obtained in Examples 1 to 7 were labeled as samples 1 to 7, respectively. 10 mg/L of these samples were added into the printing and dyeing wastewater, and compared them with widely used inorganic macromolecule flocculants, polyaluminum chloride (PAC), and organic macromolecule flocculants, polyacrylamide (PAM). The COD, ammonia-nitrogen, total phosphorus, and turbidity of the papermaking wastewater were measured by a multi-parameter water quality analyzer 5B-3B (V8). The results are shown in Table 1.

COD: GB 11914-89 water quality, COD-determining method: dichromate method
Ammonia-nitrogen: HT535-2009 Nessler's reagent spectrophotometry method
Total phosphorus: GB11893-89 ammonium molybdate spectrophotometric method
Turbidity: GB 13200-1991 determination of water quality and turbidity solution to the marking line. This solution contains 0.1 mg of ammonia nitrogen per milliliter, or 100 mg/L.

The method for preparing the ammonia nitrogen standard solution 1 (standard sample 1) includes transferring 25 mL of ammonia nitrogen stock solution into a 500 mL volumetric flask, and then adding ammonia-free water to dilute the solution to the marking line. This solution contains 0.005 mg of ammonia nitrogen per milliliter, or 5 mg/L.

Preparation of Total Phosphorus Standard Solution:

The method for preparing the total phosphorus stock solution (standard sample 1) includes weighing 0.2197±0.001 g of potassium dihydrogen phosphate ($KH_2PO_4$), which has been dried at 110° C. for 2 hours and cooled in a dryer. After dissolving with a little distilled water, 5 mL of sulfuric acid was added, follow by dissolving the solution in a 1000 mL volumetric flask and mix evenly. This standard solution contains 50.0 mg/L of phosphorus.

The method for preparing the total phosphorus standard solution (standard sample 2) includes transferring 50 mL of the total phosphorus stock solution into a 1000 mL volumetric flask and adding distilled water to dilute the solution to the marking line.

Preparation of Turbidity Standard Solution:

The method for preparing the turbidity-free water: referring to the method stipulated in JJG880 <<Turbidity Meter>> national metrological verification regulations, it is necessary to repeatedly the filter distilled water (or electro-dialysis water, ion-exchanged water) for two or more times by using a selected microporous membrane with a pore size of no more than 0.2 micron. The resulting filtrate is turbidity-free water which is ready for testing.

TABLE 1 the test results of samples 1-7 as water treatmentagents prepared from Examples 1-7:

| | wastewater stock solution | added with PAC | added with PAM | added with sample 1 | added with sample 2 | added with sample 3 | added with sample 4 | added with sample 5 | added with sample 6 | added with sample 7 |
|---|---|---|---|---|---|---|---|---|---|---|
| COD mg/L | 3421.28 | 337.34 | 255.54 | 122.72 | 93.12 | 50.19 (primary treatment standard) | 38.32 (primary treatment standard) | 48.30 (primary treatment standard) | 45.35 (primary treatment standard) | 43.36 (primary treatment standard) |
| ammonia-nitrogen mg/L | 61.33 | 41.20 | 25.33 | 16.35 | 15.33 | 4.52 (primary treatment standard) | 3.73 (primary treatment standard) | 4.88 (primary treatment standard) | 4.64 (primary treatment standard) | 5.21 (primary treatment standard) |
| total phosphorus mg/L | 29.50 | 16.32 | 9.20 | 1.26 | 0.82 | 0.31 (primary treatment standard) | 0.21 (primary treatment standard) | 0.28 (primary treatment standard) | 0.39 (primary treatment standard) | 0.36 (primary treatment standard) |
| turbidity NTU | 160.29 | 15.28 | 16.35 | 13.28 | 12.39 | 3.33 | 2.28 | 2.65 | 3.52 | 3.24 |

Preparation of COD Standard Solution:

The method for preparing the COD standard solution includes weighing 0.4251 g of potassium hydrogen phthalate ($HOOC_6CH_4COOK$), which was dried at 105° C. for 2 hours and cooled in a dryer; and all potassium hydrogen phthalate in the distilled water and being diluted to 1000 mL for mixing.

Preparation of Ammonia Nitrogen Standard Solution:

The method for preparing the ammonia-nitrogen stock solution includes accurately weighing 0.3819 g of ammonium chloride ($NH_4Cl$), which has been dried at 100° C.; and transferring the ammonium chloride into a 1000 mL volumetric flask and adding ammonia-free water to dilute the As shown in Table 1, when samples 1 to 7 were added for treatment, the COD, ammonia-nitrogen, and total phosphorus in the water have reached the secondary treatment standards for printing and dyeing wastewater specified by the state, and most of the results have reached the primary standard, where sample 4 has the best effect.

Example 8

30 g of ASA, 10 g of VBTAC, and 10 g DMAEMA were added in a four-neck flask followed by adding 500 g of deionized water to stir and dissolve. Nitrogen was passed into the four-neck flask for deaeration, and a Dimroth condenser was attached to provide reflux protection. After 30 minutes, 20 g of VAC, 30 g of AM, and 400 g of deionized water were added into the four-neck flask, followed by continuous stirring for 30 minutes and then transferred into an oil bath pot. The mixture was gradually heated to 60° C. at a stirring speed of 100 to 200 rpm, and slowly titrated with the potassium persulfate (0.1 g in 10 mL water), which is a type of initiator, in a first titration. After the first titration was completed, a water-soluble azo initiator (V-50) aqueous solution (0.3 g in 10 mL water) was used to titrate the mixture from the first titration in a second titration which is in the same manner as in the first titration. After the second titration was completed, the reactants in the mixture reacted for 18 hours under constant temperature and stirring speed to obtain a reaction solution. Finally, the reaction solution was cooled to room temperature, then transferred it into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, pentapolymer-containing macromolecular water treatment agent.

Example 9

30 g of ASA, 10 g of VBTAC, and 10 g DMAEMA were added in a four-neck flask followed by adding 500 g of deionized water to stir and dissolve. Nitrogen was passed into the four-neck flask for deaeration, and a Dimroth condenser was attached to provide reflux protection. After 30 minutes, 20 g of VAC and 30 g of AM, and 400 g of deionized water into the four-neck flask were added, followed by continuous stirring for 30 minutes and transferring into an oil bath pot. The mixture was gradually heated to 80° C. at a stirring speed of 100 to 200 rpm, and slowly titrated with the potassium persulfate (0.1 g in 10 mL water), which is a type of initiator, in a first titration. After the first titration was completed, a water-soluble azo initiator (V-50) aqueous solution (0.3 g in 10 mL water) was used to titrate the mixture from the first titration in a second titration which is in the same manner as in the first titration. After the second titration was completed, the reactants in the mixture reacted for 18 hours under constant temperature and stirring speed to obtain a reaction solution. Finally, the reaction solution was cooled to room temperature, then transferred into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, pentapolymer-containing macromolecular water treatment agent.

Example 10

30 g of ASA, 10 g of VBTAC, and 10 g DMAEMA were weighed in a four-neck flask followed by adding 500 g of deionized water to stir and dissolve. Nitrogen was passed into the four-neck flask for deaeration, and a Dimroth condenser was attached to provide reflux protection. After 30 minutes, 20 g of VAC, 30 g of AM, and 400 g of deionized water were added into the four-neck flask, followed by continuous stirring for 30 minutes and transferred into an oil bath pot. The mixture was gradually heated to 60° C. at a stirring speed of 100 to 200 rpm, and slowly titrated with the water-soluble azo initiator (V-50) aqueous solution (0.3 g in 10 mL water) in a first titration. After the first titration was completed, potassium persulfate (0.1 g in 10 mL water), which is a type of initiator, was used to titrate the mixture from the first titration in a second titration which is in the same manner as in the first titration. After the second titration was completed, the reactants in the mixture reacted for 18 hours under constant temperature and stirring speed to obtain a reaction solution. Finally, the reaction solution was cooled to room temperature, then transferred into a dialysis tubing with a molecular weight cut-off of 8000 to 14000 Da, and then dialysis was performed for purification. After 4 days of dialysis, the solution was transferred into a freeze dryer to undergo freeze-drying to obtain a final product, that is, pentapolymer-containing macromolecular water treatment agent.

The order of addition of the initiator in Example 9 was reversed in Example 10 by adding the water-soluble azo initiator (V-50) aqueous solution first, followed by addition of potassium persulfate. The results indicated that the water treatment efficiency is significantly reduced after reversing the order of addition of the initiators.

The products obtained in Examples 8 to 10 were labeled as samples 8 to 10, respectively. 5 mg/L of these samples were added into the printing and dyeing wastewater, and compared them with widely used inorganic macromolecule flocculants, PAC, and organic macromolecule flocculants, PAM. The COD, ammonia-nitrogen, total phosphorus, and turbidity of the papermaking wastewater were measured by a multi-parameter water quality analyzer 5B-3B (V8). The results are shown in Table 2.

TABLE 2 the test results of samples 8-10 as water treatment agents prepared from Examples 8-10:

| | wastewater stock solution | added with PAC | added with PAM | added with sample 8 | added with sample 9 | added with sample 10 |
|---|---|---|---|---|---|---|
| COD mg/L | 2305.33 | 360.32 | 335.25 | 56.96 | 66.85 | 70.36 |
| Ammonia-nitrogen mg/L | 49.36 | 33.25 | 31.20 | 5.12 | 6.32 | 8.14 |
| total phosphorus mg/L | 24.89 | 12.36 | 8.65 | 0.35 | 0.48 | 0.49 |
| turbidity NTU | 10.32 | 2.78 | 2.14 | 0.04 | 0.19 | 0.32 |

Example 11

The products obtained in Examples 3-7 were respectively put into black paper making wastewater with a large amount of suspended matters. The wastewater contained heavy metal ions such as chromium ions (the concentration is 3.804 mg/L), lead ions (the concentration is 1.763 mg/L), and cadmium ions (the concentration is 0.462 mg/L), etc. The contents of the heavy metal ions were measured by a multi-parameter heavy metal analyzer, where the standard solutions used for testing were national standard GSB 04-1723-2004 (chromium standard solution), GSB 04-1742-2004 (lead standard solution), GSB 04-1721-2004 (cadmium standard solution). The sample volume is 5 mg/L to 50 mg/L. After sufficient agitation, it could be found that a large number of coarse flocs were quickly appeared and sedimented in the papermaking wastewater when the papermaking wastewater was left to stand for a short period of time, and the wastewater turns to colorless and clear accordingly. After further testing, it could be found that the average concentration of chromium ions was 0.072 mg/L and the removal rate reached 98.1%; the average concentration of lead ions was 0.031 mg/L and the removal rate reached 98.2%; the average concentration of cadmium ions was 0.005 mg/L and the removal rate reached 98.9%.

The present invention provides a pentapolymer, where the production of which is initiated by an initiator, and is high in molecular weight. The advantages of the present invention include good product stability, a wide range of applications, high water purification efficiency, strong adsorption bridging ability, less dosage requirement, and result in a sturdy sludge cake and easily separated flocs.

In the molecular chain of multi-copolymer of the present invention, the polar amide group is a strong adsorbable group mainly composed of hydrogen bonds, where the hydrogen atoms on both oxygen atoms and nitrogen atoms can form hydrogen bonds, enhancing the adsorption ability of the multi-copolymer and improving the flocculation efficiency. The functional group —$CONH_2$ has a strong bridging adsorption capacity for colloidal particles, causing the particles to form coarse alum, thereby accelerating precipitation. The carboxyl groups or hydroxyl groups in the molecular chain of the multi-copolymer can interact with heavy metal ions in water and form coordinate covalent bonds to capture the heavy metals. In addition, the amino groups in the molecular chain can also interact with heavy metal ions to form coordination compounds. The participation of multiple ligands has improved the efficiency of heavy metal removal and its scope of application. The carboxyl functional groups in the multi-copolymer molecular chain can chelate with calcium and magnesium ions in water, and they are adsorbed on the surface of scale crystals during the scale formation process so that the scale cannot be generated normally, which is beneficial to the reuse of the treated water. There are hydrophilic tertiary amine, carbonyl and hydrophobic alkyl groups present in the molecular structural unit of the multi-copolymer which results in a good effect on removing suspended particles and is not easily affected by pH value and metal ions. The cationic monomer could well neutralize the negative charge on the surface of colloidal particles in wastewater because it is positively charged, making it more tightly and firmly associated with the colloidal particles. Meanwhile, the captured heavy metal ions greatly increase the specific gravity of the flocculent material, thereby further optimizing the flocculation efficiency and the final separation of flocs.

The multi-copolymer of the present invention could be used in combination with conventional inorganic macromolecule flocculants, leading to excellent removal efficiency on colloidal particles and chromium, nickel and other heavy metal ions in electroplating wastewater The present invention is simple, mature, low cost, safe, non-toxic, environmentally friendly, and easy to operate. The water purification efficiency of the invention is higher than that of conventional macromolecule flocculants and provides a variety of functions that enables multiple applications of the present invention.

It is worth noting that the foregoing examples are only used for illustration of the technical solutions of the present invention and non-limiting thereto. Though reference is made to preferred examples for detailed illustration of the present invention, a skilled person in the art should understand that the technical solutions provided by the present invention can vary or be substituted by equivalents without departing from the spirit and scope of the technical solutions described herein, which should fall within the scope of the appended claims.

What is claimed is:

1. A multi-copolymer comprising vinyl acetate, acrylamide, alkenyl succinic anhydride, vinylbenzyltrimethylammonium chloride, and dimethylaminoethyl methacrylate, wherein a mass ratio of vinyl acetate:acrylamide:alkenyl succinic anhydride:vinylbenzyltrimethylammonium chloride:dimethylaminoethyl methacrylate is 10-30:10-30:10-30:10-30:10-30.

2. The multi-copolymer according to claim 1, wherein the mass ratio of the vinyl acetate:acrylamide:alkenyl succinic anhydride:vinylbenzyltrimethylammonium chloride:dimethylaminoethyl methacrylate is 20:30:30:10:10.

3. A method for producing a multi-copolymer, comprising:
   pre-mixing 10 to 30 parts by mass of alkenyl succinic anhydrides, 10 to 30 parts by mass of vinylbenzyltrimethylammonium chloride, and 10 to 30 parts by mass of dimethylaminoethyl methacrylate with water to form a first mixture;
   reacting the first mixture comprising passing an inert gas through the first mixture to provide reflux protection, adding 10 to 30 parts by mass of vinyl acetate and 10 to 30 parts by mass of acrylamide to form a second mixture, and heating the second mixture while adding an initiator to initiate a polymerization reaction;
   wherein said parts by mass are with respect to the second mixture.

4. The method according to claim 3, wherein said pre-mixing comprises adding the water at a weight which is 10 times of the total weight of the alkenyl succinic anhydrides, vinylbenzyltrimethylammonium chloride and dimethylaminoethyl methacrylate.

5. The method according to claim 4, wherein said passing an inert gas through the first mixture to provide reflux protection comprises passing nitrogen through the first mixture and attaching a Dimroth condenser, and then adding the vinyl acetate and the acrylamide after said passing nitrogen through the first mixture for 20 minutes.

6. The method according to claim 4, wherein said heating the second mixture and adding the initiator therein to initiate the polymerization reaction comprises dissolving 0.1 to 1.0 parts by mass of potassium persulfate into 20 mL of water to form a potassium persulfate solution; heating the potassium persulfate solution until 50 to 80° C.; slowly titrating the potassium persulfate solution for 1 hour; dissolving 0.1 to 1.0 parts by mass of azobisisobutylphosphonium hydrochloride initiator into 20 mL water to form a azobisisobutylphosphonium hydrochloride initiator solution; and slowly titrating the azobisisobutylphosphonium hydrochloride initiator solution for 1 hour;
   wherein said parts by mass are with respect to the second mixture.

7. The method according to claim 4, wherein the polymerization reaction is carried out at a reaction temperature at 50 to 80° C. for a reaction time of 14 to 22 hours, wherein the reaction solution is stirred at a speed of 100 to 300 rpm, and wherein the pH value of the reaction solution is kept within a range from 3.0 to 10.0.

8. The method according to claim 4, wherein a mass ratio of the vinyl acetate:acrylamide:alkenyl succinic anhydride:vinylbenzyltrimethylammonium chloride:dimethylaminoethyl methacrylate is 20:30:30:10:10.

9. The method according to claim 4, further comprising:
   allowing the reaction solution to stand and cool to room temperature, followed by conducting dialysis in a dialysis tubing with a molecular weight cut-off of 8000 to 14000 Da for 3 to 4 days; and transferring the reaction solution into a freeze dryer to undergo freeze-drying for 48 to 72 hours to obtain a solid, powdery pentapolymer.

10. The method according to claim 3, wherein said passing an inert gas through the first mixture to provide reflux protection comprises passing nitrogen through the first mixture and attaching a Dimroth condenser, and then adding the vinyl acetate and the acrylamide after said passing nitrogen through the first mixture for 20 minutes.

11. The method according to claim 3, wherein said heating the second mixture and adding the initiator therein to initiate the polymerization reaction comprises dissolving 0.1 to 1.0 parts by mass of potassium persulfate into 20 mL of water to form a potassium persulfate solution; heating the potassium persulfate solution until 50 to 80° C.; slowly titrating the potassium persulfate solution for 1 hour; dissolving 0.1 to 1.0 parts by mass of azobisisobutylphosphonium hydrochloride initiator into 20 mL water to form a azobisisobutylphosphonium hydrochloride initiator solution; and slowly titrating the azobisisobutylphosphonium hydrochloride initiator solution for 1 hour;

wherein said parts by mass are with respect to the second mixture.

12. The method according to claim 3, wherein the polymerization reaction is carried out at a reaction temperature of 50 to 80° C. for a reaction time of 14 to 22 hours, wherein the reaction solution is stirred at a speed of 100 to 300 rpm, and wherein the pH value of the reaction solution is kept within a range from 3.0 to 10.0.

13. The method according to claim 3, wherein a mass ratio of the vinyl acetate:acrylamide:alkenyl succinic anhydride:vinylbenzyltrimethylammonium chloride:dimethylaminoethyl methacrylate is 20:30:30:10:10.

14. The method according to claim 3, further comprising:
allowing the reaction solution to stand and cool to room temperature, followed by conducting dialysis in a dialysis tubing with a molecular weight cut-off of 8000 to 14000 Da for 3 to 4 days; and
transferring the reaction solution into a freeze dryer to undergo freeze-drying for 48 to 72 hours to obtain a solid, powdery pentapolymer.

15. A method for treating wastewater comprising applying the multi-copolymer prepared according to the method of claim 3.

* * * * *